Jan. 21, 1958    C. E. FRANTZ ET AL    2,820,367
DEVICE FOR CONVEYING AND ROTATING OBJECTS
Filed Jan. 23, 1956
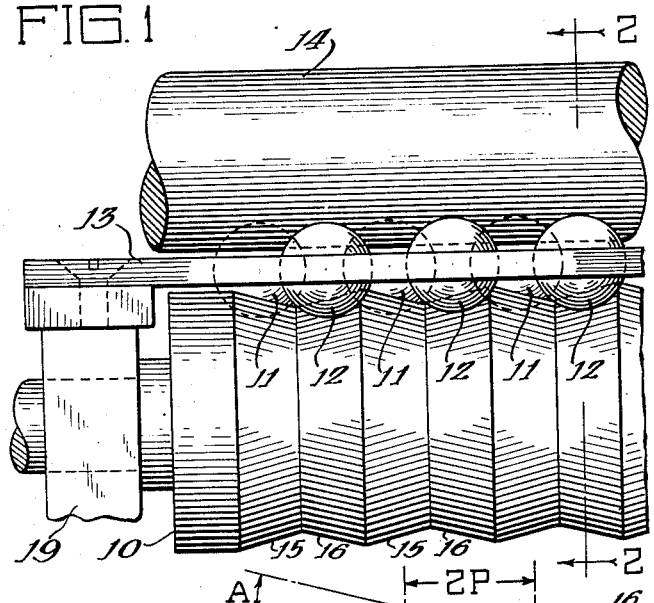
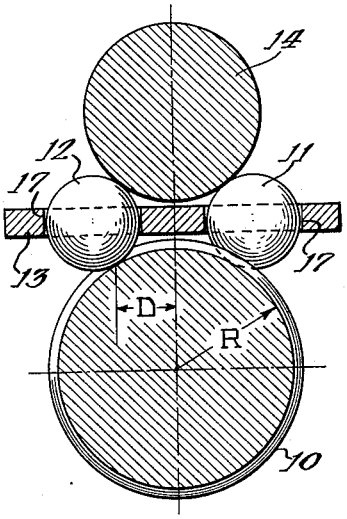
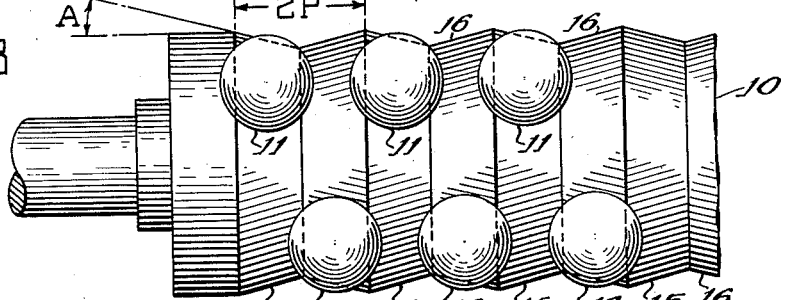
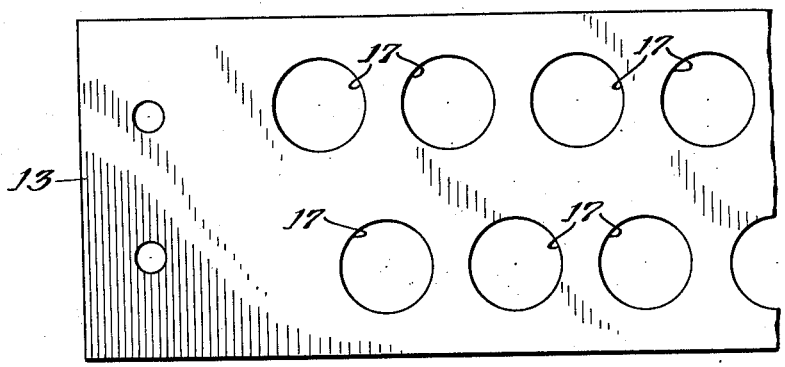
INVENTORS
Charles E. Frantz
John Roslund
BY
Roland A. Anderson
Attorney United States Patent Office 2,820,367
Patented Jan. 21, 1958

2,820,367

DEVICE FOR CONVEYING AND ROTATING OBJECTS

Charles E. Frantz, Richland, Wash., and John Roslund, Hayward, Calif., assignors to the United States of America as represented by the United States Atomic Energy Commission Application January 23, 1956, Serial No. 560,913

3 Claims. (Cl. 74—22)

This invention relates to conveyors and, more particularly, to conveyors that rotate articles while shifting them bodily.

Various advantages may be obtained with conveyors of this type. Articles being conveyed can be inspected in all parts when they are rotated. Moreover the articles could receive extensive treatment while rotated, and treatment could be applied to the articles themselves as well as to the contents thereof.

The conveyor of the present invention is intended to rotate an article while forwarding it in the direction of its axis of rotation. This conveyor is ideally suited to moving the article past an inspection station at which all portions of the article are presented for inspection because of rotation thereof. According to the present invention, a cylindrical article is rotated and shifted axially by means of balls that are rotated in a special way by contact with conical sections of a roll tapering in two directions.

In the drawings:

Fig. 1 is a side view of the novel conveyor of the present invention, showing a cylindrical article in position on the conveyor for being conveyed thereby;

Fig. 2 is a vertical sectional view taken on the line 2—2 of Fig. 1;

Fig. 3 is a plan view of the apparatus with a guide plate omitted; and

Fig. 4 is a plan view of the guide plate.

As shown in Figs. 1 and 2, the novel conveyor of the present invention comprises a roll 10, two sets of spherical balls 11 and 12, and a guide plate 13 maintaining the balls 11 and 12 in spaced relation to one another and in contact with the roll 10. A cylindrical article 14 to be treated or inspected is supported by the balls 11 so as to be rotated thereby and to be shifted axially therealong as the roll 10 rotates and causes the balls 11 to rotate.

The roll 10 has a plurality of conical sections 15 tapering in one direction and a plurality of conical sections 16 tapering in the opposite direction and placed between the conical sections 15 so that the sections 15 alternate with the sections 16. Each of the sections 15 and 16 is at the same angle with the axis of rotation of the roll 10, which angle is designated as A. The guide plate 13 has two spaced parallel lines of openings 17 receiving the balls 11 and 12, the openings of one line being staggered and alternating with respect to the openings of the other line, so that the balls 11 lie spaced from one another in a straight line in contact with the conical sections 15 of the roll 10 and the balls 12 lie in spaced relation to one another and in contact with the conical sections 16, the balls 12 lying in a line that is spaced from and parallel to the line in which the balls 11 lie. The balls 11 may be considered to alternate with the balls 12 if one takes into account that the line of the balls 11 is spaced from the line of the balls 12. Each of the balls 11 and 12 has the same diameter and contacts a conical section 15 or 16 of the roll 10 at the same radius or distance from the axis of rotation of the roll 10, which radius or distance is designated as R.

As shown in Fig. 2, the point of contact of each ball 11 with the roll 10 is spaced the same distance from a plane containing the axis of the roll 10 and the article 14 being conveyed as the point of contact of each ball 12 with the roll 10 is, which distance is designated as D. In other words, the line formed by the contact points of the balls 11 with the roll 10 is displaced from the line formed by the contact points of the balls 12 with the roll 10 by a distance 2D. Because the balls 11 and 12 are rotated by virtue of contact with the conical sections 15 and 16 of the rotating roll 10, the balls 11 and 12 rotate the article 14 as well as shift it along its axis of rotation. The ratio of the theoretical rotational speed of the article 14 to the theoretical axial speed thereof is expressed by $$\frac{D \tan A}{R}$$

where, as previously indicated, D is one-half the distance between the line of contacts of the balls 11 with the roll 10 and the line of contacts of the balls 12 with the roll 10, A is the angle of the conical sections 15 and 16 with the axis of the roll 10, and R is the radius at which the balls 11 and 12 contact the roll 10. From this expression it will be seen that decreasing angle A or flattening the conical sections 15 and 16 will decrease the axial movement of the article 14 for a given rotational movement thereof.

If it is assumed that all the conical sections 15 and 16 are of the same axial length, which is designated as P, and that balls 11 and 12 contact the conical sections 15 and 16 at said points in their lengths, and that each of the conical sections 15 and 16 has a maximum radius $R_m$, then the expression for the ratio of the axial motion of the article 14 to the rotational motion thereof becomes $$\frac{2D \tan A}{2R_m - P \tan A}$$

If the frictional component of each of the balls 11 and 12 against its guide-plate opening 17 is to be reduced, the dimension D should be a minimum and the dimension R should be a maximum. The balls 11 and 12 are desirably placed at the same level so that the pressure of the article 14 is the same both against the balls 11 and against the balls 12.

As the article 14 is rotated and shifted axially along the apparatus of the present invention, it may be visually inspected for external faults or may be subjected to the scrutiny of special testing equipment for indicating internal conditions or defects, for example, the uniformity of a corrosion-resistant coating on a nuclear fuel slug. It is also possible to utilize the rotation of the article 14 on its journey along the conveyor for treatment involving, for example, heating all side surface portions of the article, or mixing liquid contents of the article.

The roll 10 may be rotated by means of a gear, not shown, fixed to one end of the roll. The roll 10 is rotatably mounted in supports 19 at the ends of the roll, only one support being shown in Fig. 1. These supports can also be used for carrying the guide plate 13, which is secured at its ends to the supports.

The intention is to limit the invention only within the scope of the appended claims.

What is claimed is:

1. Apparatus for conveying a cylinder in the direction of its axis while rotating it about its axis, said apparatus comprising a roller composed of conical sections tapering alternately in one direction and the opposite direction, a guide plate positioned over the roller and having two parallel lines of openings, the openings in one line being over the conical sections that taper in one direction, the openings in the other line being over the conical sections that taper in the other direction, and spherical balls positioned in the openings so as to extend below the plate into engagement with the conical sections and to project above the plate for supporting the cylinder.

2. Apparatus for conveying a cylinder in the direction of its axis while rotating it about its axis, said apparatus comprising a guide plate having two spaced parallel lines of openings, the openings of one line being staggered and alternating with respect to the openings of the other line, balls positioned in the openings, and a roll positioned beneath the guide plate in parallelism with the said lines of openings and having one set of conical sections tapering in one direction and engaging the balls positioned in the openings of one line and a second set of conical sections tapering in the opposite direction and engaging the balls positioned in the openings of the other line.

3. Apparatus for conveying a cylinder in the direction of its axis while rotating it about its axis, said apparatus comprising a guide plate having two spaced parallel lines of openings, the openings of one line being staggered and alternating with respect to the openings of the other line, balls positioned in the openings, and means for supporting the balls and rotating them so as to cause them to rotate the cylinder and to shift it in the direction of its axis of rotation.

References Cited in the file of this patent

UNITED STATES PATENTS

| | | |
|---|---|---|
| 2,152,518 | Wolff | Mar. 28, 1939 |
| 2,781,891 | Bloom | Feb. 19, 1957 |